United States Patent [19]

Mercier

[11] 4,234,017

[45] Nov. 18, 1980

[54] ACCUMULATOR DEVICE OR THE LIKE

[75] Inventor: Jacques H. Mercier, Paris, France

[73] Assignee: Normand Trust, New York, N.Y.

[21] Appl. No.: 91,036

[22] Filed: Nov. 5, 1979

Related U.S. Application Data

[63] Continuation of Ser. No. 919,893, Jun. 28, 1978, abandoned.

[51] Int. Cl.[3] .............................................. F16L 55/04

[52] U.S. Cl. ..................................... 138/30; 220/85 B

[58] Field of Search ................... 138/26, 30; 220/85 B

[56] References Cited

U.S. PATENT DOCUMENTS

| | | | |
|---|---|---|---|
| 3,001,268 | 9/1961 | Greer | 138/30 X |
| 3,038,501 | 6/1962 | Greer | 138/30 |
| 3,137,317 | 6/1964 | Peters | 138/30 |
| 3,220,594 | 11/1965 | Ortheil et al. | 138/30 X |
| 3,256,911 | 6/1966 | Mercier et al. | 138/30 |
| 3,259,147 | 7/1966 | Mercier et al. | 138/30 |
| 3,477,473 | 11/1969 | Henry-Biabaud | 138/30 |
| 3,494,378 | 2/1970 | Greer | 138/30 |
| 3,674,054 | 7/1972 | Mercier | 138/30 |
| 3,948,287 | 4/1976 | Sugimura et al. | 138/30 |
| 4,010,773 | 3/1977 | Bihlmaier | 138/30 |
| 4,084,621 | 4/1978 | Sugimura et al. | 138/30 |

FOREIGN PATENT DOCUMENTS

| | | | |
|---|---|---|---|
| 2048647 | 5/1972 | Fed. Rep. of Germany | 138/30 |

*Primary Examiner*—James E. Bryant, III
*Attorney, Agent, or Firm*—Arthur B. Colvin

[57] ABSTRACT

An accumulator device or the like comprising a pressure vessel having a cylindrical interior with a port at each end and an elastomeric separator or bladder interposed between the ports. An annular supporting member engages an enlarged bead at the open mouth portion of the bladder. The device is characterized by the supporting member which is in a non-critical manner bonded to the inner walls of the casing, cooperating with the bead by virtue of the special shapes thereof to coordinate with the bead and with the casing in such manner that the bead is deformed in the mounted position thereof so as to define a fluid-tight seal between the supporting member and casing. The spacing of the terminal end of the supporting member remote from the portion connected to the casing is spaced from the inner wall of the casing a radial distance substantially equal to or greater than the wall thickness of the bladder. The maximum radial thickness of the bead is between about two and one-half and three times the thickness of the wall of the bladder.

13 Claims, 9 Drawing Figures

ACCUMULATOR DEVICE OR THE LIKE

This is a continuation of application Ser. No. 919,893, filed June 28, 1979, now abandoned.

BACKGROUND OF THE INVENTION

The present invention relates to pressure vessels, and more particularly to pressure vessels of the type comprising a rigid casing having axially aligned ports at its respective ends and a deformable separator dividing the vessel into two variable volume fluid chambers communicating respectively with the port. The deformable separator is in the form of a bladder having a closed lower end and a mouth with a peripheral bead. The bladder is attached at its mouth to an annular supporting member disposed inwardly of and fixed to the casing.

THE PRIOR ART

Known annular supporting members are of the thick or thin-walled construction. In the first type of annular supporting member a groove is cut deep in the thick-walled annular supporting member and accommodates the bead of the bladder therein. In the second type of construction the bead is actually molded on the end of the thin-walled annular supporting member. Examples of the first type of construction in U.S. Pat. Nos. 2,394,401 (Overbeke) and 3,168,907 (Mercier et al), and of the second type in my U.S. Pat. Nos. 3,946,759 and 3,830,259.

It has also been proposed to clamp the bladder between a supporting member of thin-walled construction and the casing, just below the bead on the bladder which is then received in an annular groove in a hooklike portion of the supporting member as disclosed in U.S. Pat. No. 3,948,287 (Sugimura et al.). Such clamping of the bead occurs precisely where traction and flexure forces on the bladder are greatest and is a cause of considerable fatigue shortening the service life of the bladder.

SUMMARY OF THE INVENTION

A principal object of the present invention is to provide a pressure vessel having an annular supporting member of the thin-walled type having a specially formed hooklike portion coacting with a complemental bead on the deformable separator which combine to insure trouble-free securement of the deformable separator with consequent long service life. A further object of the invention is the provision of a pressure vessel which can be mass produced at low costs.

According to a more specific object of the invention there is provided a pressure vessel comprising a casing of rigid material having two closed ends with axially aligned ports; a deformable separator disposed inside said casing between said ports to define variable volume fluid chambers, said separator having a mouth defining an annular bead. An annular supporting member is fixed to an internal wall of said casing, said supporting member being of sheet material construction and including a substantially cylindrical portion adapted to bear against the internal wall of said casing. A hooklike portion having a radially outwardly opening groove for accommodating said bead of said separator is formed on said supporting member and defines a connecting zone between said substantially cylindrical portion and said hooklike portion said zone being a space of wedge shape adjacent said internal wall for accommodating excess deformed bead material to form a fluidtight seal between said annular supporting member and said casing. The end of said hooklike portion remote from said connecting zone is radially spaced from said internal wall of said casing a distance substantially equal to the undeformed wall thickness of said separator so that the portion of said separator between said end portion and said internal wall of said casing is not substantially compressed by said end portion. The bead in undeformed condition is of greater radial extent than the radial depth of said groove, and said radial depth of said groove is at least two and a half times the distance between said end portion of said supporting member and said internal wall of said casing.

Owing to this construction the deformable separator is free of substantial compression between the rounded end of the supporting member and the casing, that is, where traction and flexure forces are exerted in operation. The deformable separator is thus protected from fatigue which would otherwise be detrimental to its securement and service life. The rounded end of the supporting member, which is preferably rolled, also protects the deformable separator from tearing in the course of deformation and flexure.

The hooklike portion accommodates the bead and owing to its considerable depth permits a thickened bead to be used. During assembly the bead is compressed and bead material is squeezed upwardly and flows into the wedge-shaped space between the connecting zone and the casing, thereby compressing the bead enclosed in the hooklike portion so as to provide optimal securement.

The wedge-shaped space is sufficiently dimensioned so that bead material may be amply accommodated without a risk of shearing the deformable separator during assembly.

Another feature of this arrangement is the provision of a fluidtight seal between the annular supporting means and the casing to hermetically isolate the fluid chambers from each other so that the means for securing the annular supporting member to the casing need not insure fluid tightness.

Preferably the securing means for the supporting member are bonding means, e.g. spot welds, a continuous weld or adhesive. It is not necessary to insure systematic inspection of the continuity of the welds or adhesive since the sealing function is performed by compression of the bead in the wedge shaped space the securing means functioning merely to prevent axial shifting of the supporting member.

According to other features the hooklike portion has slightly inclined flanks of opposed slope, a first inclined flank adjoining the rounded end being substantially perpendicular to the centerline of the wall of the separator in its mean position between its rest position and its distended position against the internal wall of the casing. The second inclined flank of the hookline portion adjoining the substantially cylindrical portion of the supporting member makes an angle with respect to a plane perpendicular to the axis of the vessel which is greater than the angle which the first inclined flank makes with its plane.

Thus, preferably, the first inclined flank of the hooklike portion is of flattened frustoconical configuration.

According to still another preferred feature of the present invention the radial extent of the first flank is greater than the distance between the radially outermost surface on the rolled portion and the internal wall of the casing, whereby the first flank constitutes a retaining shoulder for the bead.

Owing to this arrangement an excellent securement of the separator is achieved since the first inclined flank provides a retaining shoulder substantially perpendicular to the line along which traction forces are exerted on the separator and in addition it assists the squeezing or flow of excess bead material towards the wedge-shaped space during mounting, thanks to the more appreciable slope of the second inclined flank of the hooklike portion. In other words, the first inclined flank forms a bead retaining shoulder and the second inclined flank forms a slideway for orienting the movement of excess bead material towards the wedge-shaped space.

Embodiments of pressure vessels according to the invention are described hereinafter, by way of example, with reference to the accompanying drawings.

DETAILED DESCRIPTION OF THE PREFERRED EMBODIMENT

Figure 1:
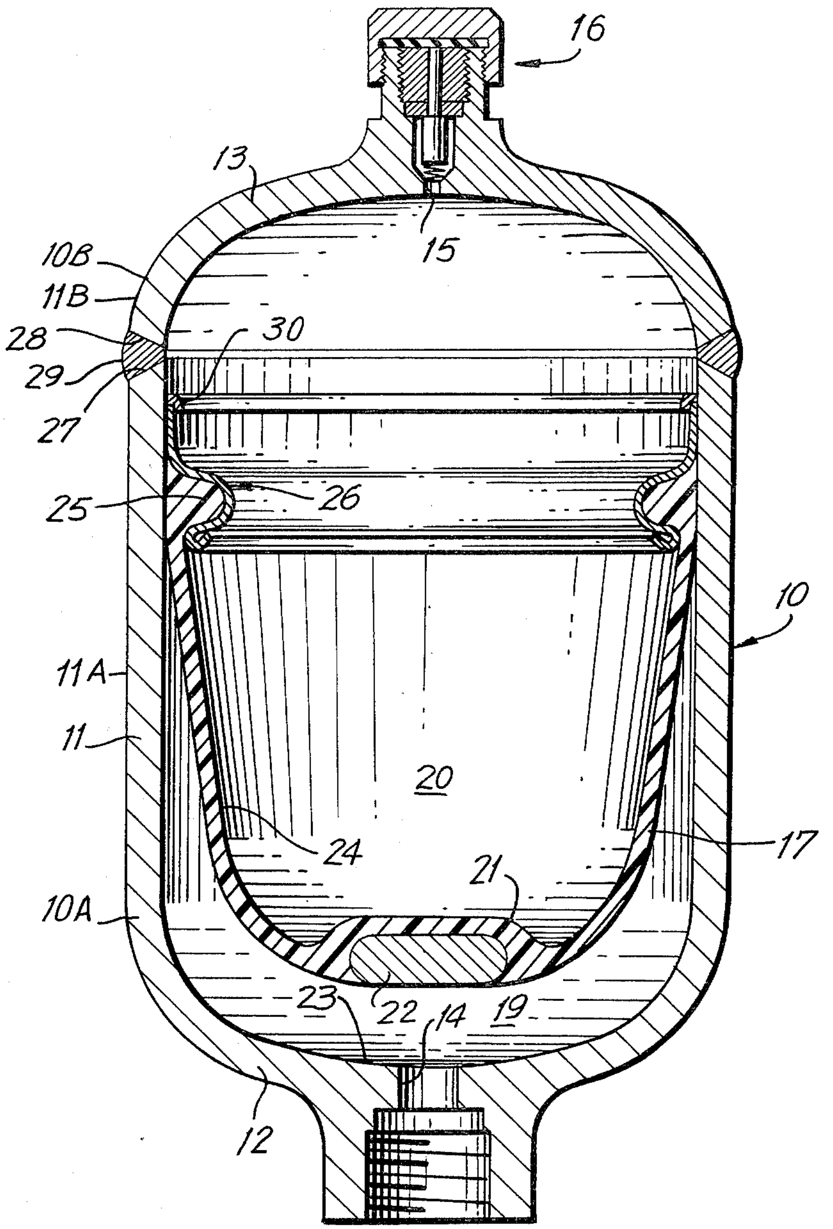
FIG. 1 is a longitudinal sectional view of a pressure vessel embodying the present invention.

Reference will first be had to FIGS. 1–6 which illustrate by way of nonlimiting example, an oil-gas type pressure vessel. The pressure vessel comprises a casing 10 of rigid material, such as steel, capable of withstanding the pressures to which the pressure vessel will be subjected in use.

The casing 10 comprises a generally cylindrical body 11 with closed ends 12 and 13. The closed end 12 has a fluid port 14, for example an oil port, adapted to be connected to a fluid coupler (not shown). The other closed end 13 has a fluid port 15 for example a gas port, in which is mounted a gas charging valve 16. Ports 14 and 15 are in axial alignment.

More specifically, the casing 10 comprises first and second opposed shell members 10A and 10B. The first shell member includes the closed end 12 and a long section 11A of the cylindrical body 11. The section 11A has a sharp annular beveled lip 27. The second shell member 10B includes the closed end 13 and a short section 11B of the cylindrical body 11. The section 11B has a sharp annular beveled lip 28 slightly spaced from the beveled lip 27 of the first section 11A.

The two shell members 10A and 10B are fixed to each other by an annular weld 29 which extends inside the annular V-shaped notch defined by the beveled lips 27 and 28 of sections 11A and 11B.

A deformable separator 17 is positioned inside casing 10, the separator 17 being an elongate bladder of rubber or similar material having comparable characteristics. The bladder or separator 17 is interposed between the ports 14 and 15 to define two variable volume fluid chambers, i.e. a liquid chamber 19 and a gas chamber 20.

The deformable bladder or separator 17 has at its lower end 21 a valve member 22 which cooperates with a valve seat 23 defined around liquid port 14. The valve member 22 preferably comprises a cast steel or aluminium disc at the lower end 21 of the bladder or separator 17.

The bladder or separator 17 has a generally conical sidewall 24 flaring from the lower end 21 to a mouth 25 along which is an annular bead. The outer diameter of the mouth 25 is substantially equal to the internal diameter of the casing 10. The bead 25 is attached to an annular supporting member 26 of thin-walled or sheet material construction, e.g. steel or synthetic plastic material, mounted inwardly adjacent the cylindrical body 11. In the embodiment of FIGS. 1–6 the thickness of the supporting member 26 is less than half the thickness of the casing 11 and may, for example, be one quarter or one fifth of this thickness.

Such a pressure vessel operates in a manner known per se, as follows:

The port 14 is connected to a hydraulic unit and gas e.g. nitrogen, is supplied under pressure through valve 16 into chamber 20 until the deformable separator becomes distended and bears against the internal wall of casing 10. A stop cock (not shown) is interposed between port 14 and the hydraulic unit and when it is in open position the pressurized liquid, e.g. oil or water admitted through port 14 into chamber 19 acts against separator 17 to compress the gas in chamber 20 causing the volume in chamber 20 to be reduced and liquid to enter chamber 19. The pressure vessel is then in operative condition. Oil contained in chamber 19 is, if necessary, conveyed to the hydraulic unit by means of the pressure in the gas chamber 20 acting against the separator. When this happens, the chamber 19 empties and if it is completely emptied the valve member 22 bears sealingly against valve seat 23 to close off port 14.

The annular supporting member 26 is fixed, for instance, by a weld 30 along the inner wall of shell member 10A, slightly axially spaced from beveled lip 27.

The annular supporting member 26 of sheet material has a substantially cylindrical portion 31 the free end of which is welded at 30, followed by a fillet or radiused connecting zone 32 defining a wedge-shaped annular space C with the inner wall of the casing 11, then a hooklike portion 33 and finally a rounded or preferably rolled end portion 34.

As indicated above the annular supporting member 26 which is of relatively rigid material, such as steel or synthetic plastic material, is slightly flexible owing to its unstiffened thin-walled construction along its cylindrical portion 31, whereas its rolled portions 33 and 34 which are profiled are practically rigid. Alternatively, the cylindrical part 31 may be slightly frustoconical before mounting supporting member 26 incasing 20 so as to exert a slight prestressing action at the time of assembly.

The hooklike portion 33 comprises two slightly inclined flanks of opposed slope, and flattened frustoconical configuration, namely, a first inclined flank 35 adjoining rolled end 34 and a second inclined flank 36 adjoining connecting zone 32. The inclined flank 35 makes an angle A with a plane perpendicular to the axis of the casing and the second inclined flank 36 makes an angle B, greater than angle A, with such plane. Preferably angle B is about twice as large as angle A.

Further, inclined flank 35 is disposed perpendicular to the mean center line position D of the sidewall of the separator between the rest position (shown in phantom lines in Figure 2) and a distended position in which the separator bears against the internal wall of the casing 10.

Accordingly, the inclined flank 35 is, on the average, disposed perpendicular to the line along which the separator is tensioned in operation and acts as a retaining shoulder for bead 25. The other inclined flank 26 permits sliding of the bead material to orient its deformation into the wedge-space space for accommodating the excess compressed bead material.

Figure 2:
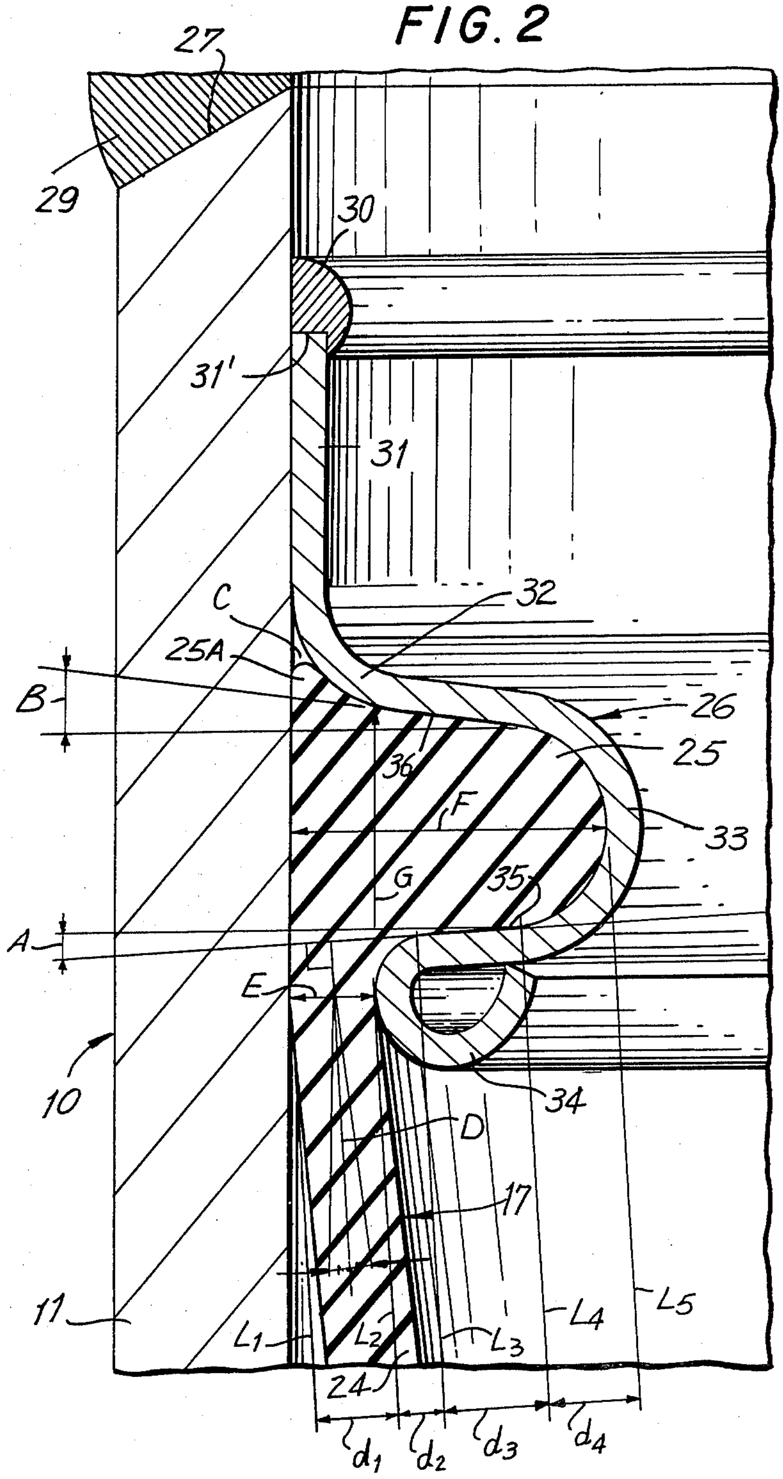
FIG. 2 is a fragmentary view on an enlarged scale showing the securement of the separator bead to the supporting member in the mounted position.

The distance E between the rolled end portion 34 of the supporting member 26 and the internal wall of the cylindrical body 11 may be clearly viewed in FIG. 2 of the drawings. This distance E is substantially equal to the thickness of the bladder or separator 17 in its rest position so as to avoid any substantial clamping or pinching of the separator 17 at this point. The depth F of the hooklike portion 33 of the supporting member as measured from the internal wall of the cylindrical body 11 is selected to be equal to or greater than two and one half times the distance E. Preferably the distance F is between two and a half and three times the distance E.

The axial height G of the hooklike portion 33 as measured from the radial outer limit of the rolled edge 34 parallel to internal wall 11 is equal to or greater than the difference between distances F and E.

With further reference to FIG. 2, the annular supporting member is shaped and dimensioned to comply with certain relationships to achieve maximum holding of the bead and thereby the entire separator.

In order to measure the various dimensions of the arrangement a series of lines are drawn parallel to the mean position D of the center line of the separator sidewall. These lines $L_1$, $L_2$, $L_3$, $L_4$ and $L_5$ are drawn as follows. Line $L_1$ is simply the outer surface of the separator 17 in its mean position of the separator corresponding to the mean position D of the center line. $L_2$ is drawn tangent to the radial outermost surface on the rolled lower portion 34. $L_3$ is drawn parallel to center line D at the junction between the beginning of the rolled lower end 34 and the lower flank 35 of the hooklike portion, $L_4$ is drawn parallel to the center line D at the junction between the start of the lower flank 35 and the arcuate hooklike portion 33. Finally, $L_5$ is drawn parallel to the center line D from the radial innermost surface of the hooklike portion 33. The distance between the lines $L_1$ and $L_2$ is $d_1$, the distance between $L_2$ and $L_3$ is $d_2$, the distance between $L_3$ and $L_4$ is $d_3$, and the distance between $L_4$ and $L_5$ is $d_4$.

According to preferred embodiment of the invention the distances $d_1$, $d_2$, $d_3$ and $d_4$ are chose so that the follow relations are satisfied:

$$d_2 < d_1 \quad (1)$$

$$d_3 > d_1 \quad (2)$$

$$d_4 \geqq d_1 \quad (3)$$

Figure 3:
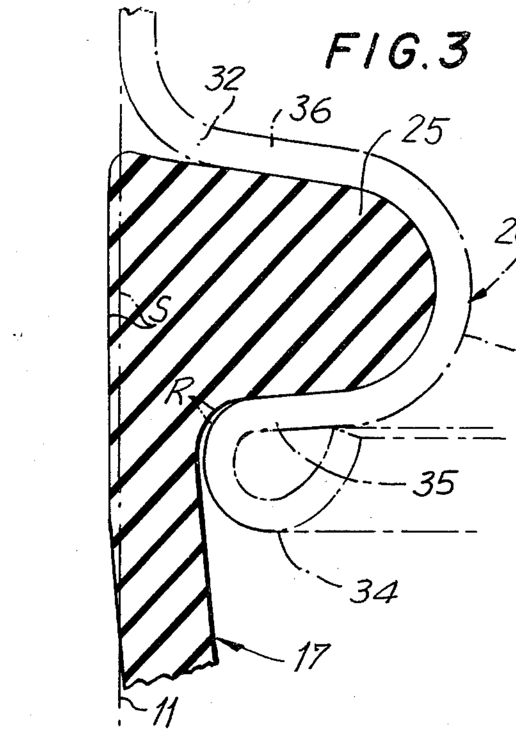
FIGS. 3–6 show the several successive stages of the mounting of the separator in the casing.
Figure 4:
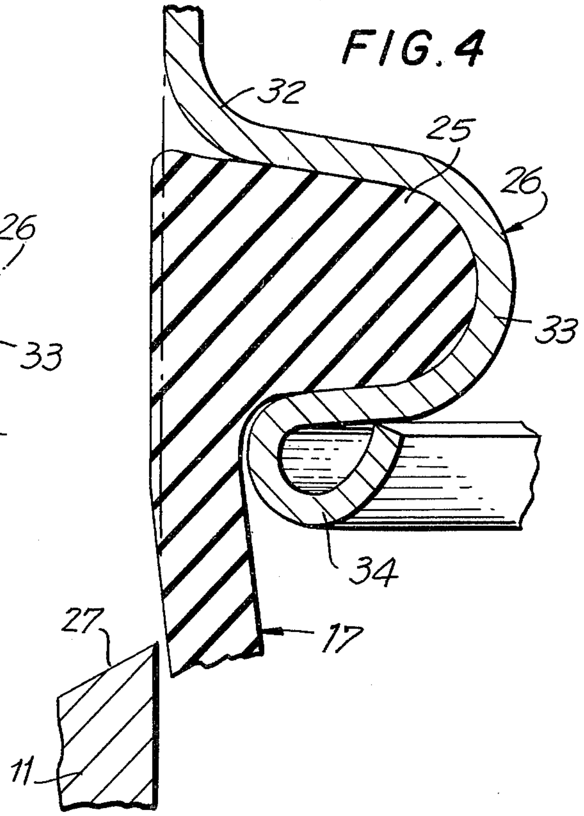
Figure 5:
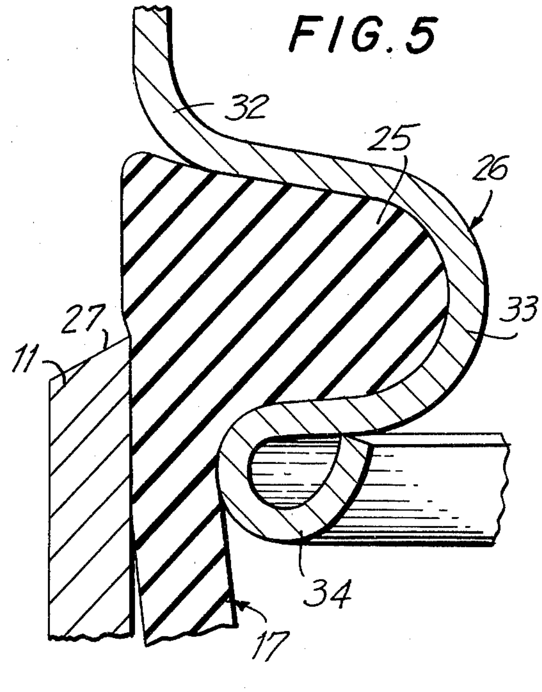
Figure 6:
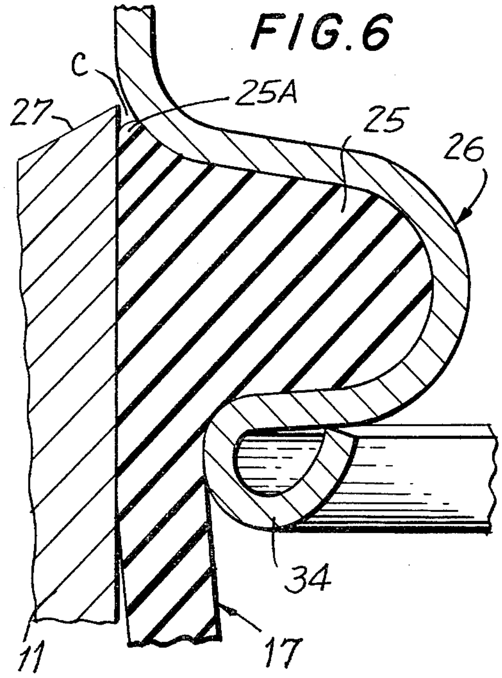

Reference is next made to FIG. 3 where the bead 25 is illustrated in solid lines in its undeformed condition, the internal wall of the cylindrical body of the pressure vessel and the bead supporting member 26 being shown in phantom lines. It is seen that the contour of the bead 25 substantially mates with the inclined flanks 35 and 36 of the hooklike part 26 and has an extra thick zone S facing the inner wall 11 of the pressure vessel and a deep cut portion R facing the rolled lower end 34 of the supporting member. The additional depth of deep cut portion R is substantially equal to the extra thickness of Zone S.

When assembling the pressure vessel, first, the bead 25 is inserted in the correspondingly shaped hooklike portion. Then the subassembly made up of the supporting member 26 and the bead 25 is introduced into the first shell member 10A [the beveled lip 27 of which is visible.] The engagement of the subassembly past the rolled edge 34 has the combined effect of the extra thick zone S compensating for the deep cut R and squeezing the deformed bead material 25A into the wedge-shaped space C defined between the connecting zone 32 and the internal wall of the casing 11 (see FIGS. 2 and 6). It should be noted that the fillet or radiused zone 32 facilitates the insertion of the cylindrical portion 31 into the shell member 10A.

This deformation of the extra thick zone S of the bead 25 produces excellent holding of the bead 25 in the hooklike portion of the supporting member without pinching the separator or bladder 17 owing to the deep cut R facing the lower rolled end. Fluidtightness between the chambers 19 and 20 is insured by the wedging of the deformed bead material 25A in the wedge-shaped space C.

It will be appreciated that the flow of the bead material into the free wedge-shaped space is favored by friction of the casing 11 against the extra thick zone upon assembly.

The wedge-shaped space C is formed sufficiently large for the bead material which flows thereinto to be amply accommodated without risking shearing of the separator or bladder by the sharp edge of the beveled lip 27 when the cylindrical portion 31 reaches the same.

Figure 7:
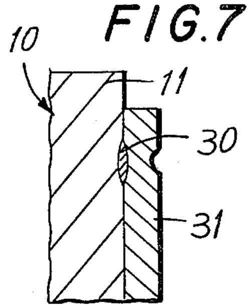
FIGS. 7 and 8 show modified embodiments in which the bonding means are spot welds and adhesive, respectively.

To insert the subassembly comprised of the supporting members 26 and the bead 25 into the shell member 10A a mandrel (not shown) is advantageously utilized. The mandrel bears against the upper end 31' of the cylindrical portion 31 and abuts against beveled lip 27 of the shell member 10A when the right predetermined position is attained, with the upper end 31' longitudinally spaced inwardly from lip 27. When the subassembly 25–26 arrives in this position in the shell member 10A of the casing, the upper end 31' of the cylindrical portion 31 is then welded to the internal wall of the casing at 30 with a continuous weld as shown in FIGS. 1 and 2, or spot welds (as shown in FIG. 7). Then the shell member 10B is brought into position on the shell member 10A and welded thereto as at 29.

It will be appreciated that the pressure vessel according to the present invention enables mass production at lower production costs with a considerable choice of casing and supporting member materials while insuring the trouble-free securement and long service life of the separator. It will be noted that it is not necessary to machine grooves or slots in the casing which are expensive and/or difficult operations specially in synthetic materials and which weaken the casing and thus require over dimensioning the casing thereby increasing their weight and cost.

The slightly inclined first flank 35 of the flattened frustoconical configuration which is perpendicular to the mean position of the center line of the separator or bladder 17 in the couse of operation, provides an extremely sturdy securement of the bladder while the fluidtightness is faultlessly insured between chambers 19 and 20 by the engagement of the deformed bead material 25A wedged between the connecting zone 32 and the inner wall of the casing 11. It is thus possible to avoid having to insure fluidtightness by the junction which secures the supporting member 26 to the casing. The device of the invention thus makes it possible to spot weld the shell members together at spaced positions, an operation which would not otherwise be permissible.

Figure 8:
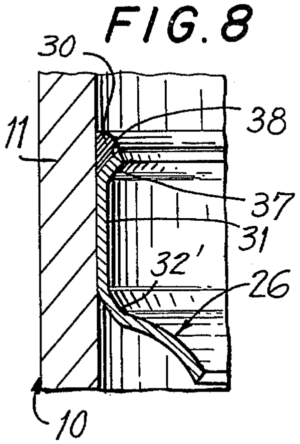

According to a modified embodiment shown in FIG. 8, which is generally similar to the previous embodiment, the upper end of the cylindrical portion 31 of the supporting member comprises an angled rim 37 which forms an annular recess 38 for a weld or a bead of adhesive 30. It should be noted that the supporting member may, in the latter case, be formed of synthetic material, and therefore admits of the use of a casing 11 of reinforced plastic material. Such a construction is especially interesting when the liquid to be used is highly corrosive with respect to metals, when a coating is not desirable on such a metal or where extremely high pressures are not to be encountered.

In case the bonding means is an adhesive, the recess 38 makes it possible to apply the same under excellent conditions for drying and hardening. Such a recess or gutter 38 help avoid dripping of not yet dried adhesive into the bladder or separator.

In FIG. 8 the connecting zone 32′ is frustoconical shape rather than radiused or filleted as in the previous embodiments.

Figure 9:
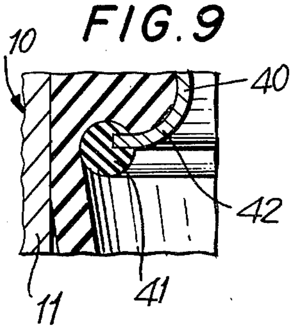
FIG. 9 is a fragmentary view of a modified embodiment in which the rolled end of the annular supporting member is a toroidal member distinct from the rest of the supporting member.

In FIG. 9 instead of the rolled end portion of the annular supporting member 40 being formed in one piece with the rest of the supporting member 40 it is distinct therefrom. The rolled lower end of the supporting member comprises a toroidal member 41 of preferably circular cross section formed of yieldable material which is harder than the bead material. Accordingly, when assembled, the bead material tends to deform around the upper surface of the toroidal member 41 as illustrated. Thus, unlike the previous embodiments wherein the rolled end portion depends from the adjoining lower or first flank, the toroidal member extends upwardly relative to the surface of the long flank 42. The toroidal member therefore tends to reinforce the holding capacity of the bead owing to its convex upper surface compared to prior art devices in which the surface of inclined portion are generally concave, which concavity weakens the hold the supporting member might otherwise provide. Finally, as illustrated, it is preferred to form the toroidal member 41 slightly offset on the free outer edge of the first flank 42 to prevent undue deformation of the bead for a given radius of the rolled portion.

It will be recognized that variations of the present pressure vessel may occur to those skilled in the art in light of the teachings hereof. Accordingly, the invention is to be broadly construed within the scope of the accompanying claims.

Having thus described my invention, what I claim as new and desire to secure by Letters Patent of the United States is:

1. A pressure vessel comprising:

(a) a casing of rigid material having two closed ends with axially aligned ports and an internal vertical planar wall;

(b) a deformable separator disposed inside said casing between said ports to define variable volume fluid chambers on either side of said separator, said separator having a mouth and an annular bead therealong;

(c) an annular separator supporting member fixed to the internal vertical planar wall of said casing, said supporting member being of sheet material construction substantially thinner than said casing and including:

(i) a substantially cylindrical portion adapted to bear against the internal wall of said casing;

(ii) a smoothly curved hooklike portion defining a radially outwardly opening groove for accommodating said bead of said separator;

(iii) a connecting zone between said substantially cylindrical portion and said hooklike portion defining a wedge-shaped space with said internal wall, said bead being clampingly disposed within said wedge-shaped space in compressed condition to define a fluid-tight seal between said supporting member and said casing; and (iv) an end portion at the end of said hooklike portion remote from said connecting zone being radially spaced from said internal wall of said casing a distance equal to or greater than the undeformed wall thickness of said separator so that the portion of said separator between said end portion and said internal wall of said casing is not compressed by said end portion;

(d) said bead including a thickened zone facing said internal wall of said casing such that in undeformed condition it is of greater radial extent than the radial depth of said groove measured to the internal wall of said casing, and said radial depth of said groove having portions which are at least two and one-half times the distance between said end portion and said internal wall of said casing, said bead having a deep cut-away zone facing said end portion of said separator supporting member so that said deep cut-away zone compensates for said thickened zone and allows expansion therein of said bead during compression of said thickened zone so as to prevent pinching of said separator in the course of mounting it in said casing.

2. A pressure vessel according to claim 1 wherein said end portion of said annular supporting member is rounded.

3. A pressure vessel according to claim 1 wherein said end portion of said supporting member is rolled.

4. A pressure vessel according to claim 1 wherein said end portion is a toroidal member which is distinct from and formed on the radially outer end of said hooklike portion.

5. A pressure vessel according to claim 4 wherein the toroidal member is formed of yieldable material harder than that of the separator, and wherein said toroidal member is disposed eccentrically of the end of the hooklike portion.

6. A pressure vessel according to claim 1 wherein said groove has generally radially extending flanks slightly inclined relative to each other.

7. A pressure vessel according to claim 6 wherein a first said flank adjoins said end portion and is substantially perpendicular to the mean position of the center line of the sidewall of said separator between its rest position and its distended position bearing against the internal wall of said casing.

8. A pressure vessel according to claim 7 wherein said first flank is of flattened frustoconical configuration.

9. A pressure vessel according to claim 7 wherein the distance $d_1$ between said end portion and the internal wall of said casing is less than the length $d_3$ of said first flank which defines a retaining shoulder for said bead, less than or equal to the length $d_4$ of said hooklike portion inwardly of said first flank, and greater than the length $d_2$ of said end portion between its radially outermost surface and its junction with said first flank.

10. A pressure vessel according to claim 7 wherein a second said flank of said groove adjoins said substantially cylindrical portion of said annular supporting member and makes an angle with a plane perpendicular to the axis of said casing greater than said first flank of said groove makes with its corresponding perpendicular plane.

11. A pressure vessel according to claim 10 wherein said second flank is of flattened frustoconical configuration.

12. A pressure vessel according to claim 10 wherein said second flank makes an angle with a plane perpendicular to the axis of said casing which is at least twice the angle said first flank makes with its plane perpendicular to the axis.

13. A pressure vessel according to claim 1 wherein the height of said groove measured in line with said end portion of said supporting member is at least equal to the difference between the radial depth of said groove and the distance between said end portion and said internal wall of said casing.

* * * * *